(12) United States Patent
Hobson et al.

(10) Patent No.: US 6,199,979 B1
(45) Date of Patent: *Mar. 13, 2001

(54) INK FILTER ELEMENT FOR PRINTERS

(75) Inventors: Alex R. Hobson, Elkton, MD (US); Robert L. Sassa, Newark, DE (US)

(73) Assignee: Gore Enterprise Holdings, Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,903

(22) Filed: Jan. 21, 1998

Related U.S. Application Data

(63) Continuation-in-part of application No. 08/786,588, filed on Jan. 21, 1997, now abandoned.

(51) Int. Cl.[7] .................................................. B41J 2/175
(52) U.S. Cl. ........................................ 347/93; 210/500.1
(58) Field of Search ................................. 347/93, 84, 86, 347/87; 210/489, 490, 500.1, 497.01, 497.1, 508; 428/311.51; 156/155; 95/273, 278, 281, 274

(56) References Cited

U.S. PATENT DOCUMENTS

| | | | |
|---|---|---|---|
| 3,953,566 | 4/1976 | Gore | 264/288 |
| 3,953,862 | 4/1976 | Amberntsson et al. | 346/140 R |
| 3,962,153 | 6/1976 | Gore | 260/2.5 R |
| 4,095,237 | 6/1978 | Amberntsson et al. | 346/140 R |
| 4,096,227 | 6/1978 | Gore | 264/210 R |
| 4,187,390 | 2/1980 | Gore | 174/102 R |
| 4,306,245 | 12/1981 | Kasugayama et al. | 346/140 R |
| 4,396,925 | 8/1983 | Kohashi | 346/140 R |
| 4,557,957 | 12/1985 | Manniso | 428/36 |
| 4,571,599 | 2/1986 | Rezanka | 346/140 R |
| 4,771,295 | 9/1988 | Baker et al. | 346/1.1 |
| 4,803,502 | 2/1989 | Hashimoto et al. | 346/140 R |
| 5,130,024 | 7/1992 | Fujimoto et al. | 210/500.36 |
| 5,330,782 | 7/1994 | Kanazawa | 427/2.25 |
| 5,342,673 | 8/1994 | Bowman et al. | 428/198 |
| 5,376,272 | 12/1994 | Spearman | 210/463 |
| 5,476,589 | 12/1995 | Bacino | 210/500.36 |
| 5,500,167 | 3/1996 | Degen | 264/41 |
| 5,555,238 | 9/1996 | Miyazawa | 347/86 |
| 5,571,413 | * 11/1996 | Mogami et al. | 210/489 |
| 5,657,065 | * 8/1997 | Lin | 347/93 |
| 5,814,405 | * 9/1998 | Branca et al. | 428/311.51 |

FOREIGN PATENT DOCUMENTS

| | | |
|---|---|---|
| 0450894 | 10/1991 | (EP) . |
| 0525630 | 2/1993 | (EP) . |
| 2295583 | 6/1996 | (GB) . |
| 7-205444 | 8/1995 | (JP) . |

* cited by examiner

*Primary Examiner*—William Royer
*Assistant Examiner*—Hoan Tran
(74) *Attorney, Agent, or Firm*—Carol A. Lewis White

(57) ABSTRACT

This present invention relates to a filter element for the filtration of printing fluid within a printer cartridge of a printer. The filter element of the present invention includes a microporous filter media that removes contaminants from printing fluids such as ink, dye, wax, or the like.

12 Claims, 6 Drawing Sheets

INK FILTER ELEMENT FOR PRINTERS

RELATED APPLICATIONS

The present application is a continuation-in-part of U.S. patent application Ser. No. 08/786,588 filed Jan. 21, 1997, now abandoned.

FIELD OF THE INVENTION

This present invention relates to a filter element for the filtration of printing fluid within a printer cartridge of a printer. The filter element of the present invention comprises a microporous filter medium that removes contaminants from printing fluids such as ink, dye, wax, and the like.

BACKGROUND OF THE INVENTION

The trend in the printer industry is to make higher resolution images at a faster rate. To do this, printer manufacturers are striving to produce prints with more dots per inch, and to develop a better understanding of dot mixing and color matching. In the case of ink jet printers, a lot of the control comes from the type of spray port which delivers ink to the receiving medium. The spray ports are extremely small holes through which the ink is forced out and onto the paper. The printer manufacturers can alter the type and number of spray ports. Typical ink jet cartridges may have from approximately 30 to 200 spray ports, and the correct operation of the spray port is critical to the proper operation of the printer. It is therefore important to filter out contamination or agglomerations which may be present in the ink prior to the ink reaching the spray ports.

Ink can be forced out the spray ports using a number of different technologies. The ink can be pressed out by a piezoelectric element which expands with a voltage and compresses the ink, creating a pressure to force the ink from a small reservoir. Other methods for forcing the ink through the spray port are referred to as bubble jet and thermal jet techniques. These and other related ink jet printing technologies will hereafter be referred to as ink jet printers, and the cartridges or housings into which the filters are placed will be referred to as "ink cartridges." There are a number of other ways of transferring ink, dye, or wax to a printing medium. Some of these technologies use heat to transform a solid wax or dye and prepare it for transfer. Other technologies directly sublime the solid to a vapor prior to transfer, which are sometimes referred to as wax thermal, dye thermal, wax/dye thermal, direct wax, direct dye, and phase change technologies. For convenience, these as well as the ink jet printing technologies described above will hereafter be referred to as "ink printers." In addition, ink, dyes, wax, and other similar combinations and types of image producing material will be referred to for convenience as "ink".

In all of these ink printer systems, it is important to ensure clean delivery of the ink. If contamination clogs the spray ports, the operation of the ink cartridge is hindered. The flow of ink to the paper may be reduced and/or the plugged ports may drip.

The trend in the industry is to make the diameter of the spray ports even smaller to improve the resolution of the image produced. It has therefore become increasingly more important and difficult to filter out particles which may plug these smaller spray ports.

The most commonly used filter medium is a woven stainless steel screen. These screens can be made with a number of different strands per inch in order to create a pore size for filtration of particles larger than a predetermined size. For example, a screen having 250×1400 strands per inch (98×550 strands per cm) in a double Dutch twill weave, as available from Tetko Inc. will provide filtration for 19 micron nominal diameter and larger particles. The efficiency of these screens will be discussed later herein.

The screens used in these applications are typically stainless steel to ensure chemical compatibility with the ink. In most cases, the ink contains surfactants and/or solvents, as well as other compounds, to promote wetting of the paper or printing substrate. Furthermore, the inks may be acidic or basic.

A significant difficulty encountered with woven screens is that they provide very little open area for filtration. The interstices between the fibers create the flow channels for the fluid, but this area is typically only 10 to 20% of the overall area of the filter. Thus, the small available area for filtration creates a high resistance to flow for the ink. In addition, the ink cartridges are being required to dispense the ink at a rapid rate because of the demands associated with higher speed printers and the increased use of color printing. Color images have a much higher degree of ink coverage to create an image, and therefore, require more ink to be dispensed. These new trends make lowering the resistance to flow more critical. For the reasons noted above, woven screens are not the ideal filter medium for the filtration of particles at higher flow rates.

In addition, the dimensions of woven screens are limited by the number of strands per inch that can be woven, and the screens become increasingly more expensive as the number of strands per inch increases. Thus, cost of woven screens limits their use in these high volume, cost sensitive products.

A further problem with stainless steel screens is that they are difficult to bond and seal to the , typically, plastic ink jet cartridge housings. The filter material is typically heat staked to the plastic, and because of the irregular edges of the screen, a complete seal is difficult to produce. When cut into disc shapes, the woven screen has ragged edges which if not sealed properly can create a leak path for large particles to pass through. In some cases, the stainless steel screen is applied with an adhesive to ensure a good seal. However, this is a time consuming and costly process. Thus, yield rates for applying these screens to the ink cartridge housing are below a desirable level due to these processing problems.

Further, the stainless steel screen can shed loose particles or fibers which can then contaminate or clog the spray ports. When the screen is cut, typically by die cutting, the overlapping metal strands can be pinched and broken. These small screen fragments can shed after the filter disc is adhered to the ink jet cartridge. When one of the shed strands gets downstream of the filter disc, it can clog the spray port head, creating problems with the printer.

Finally, in some applications, such as thermal dye sublimation, a solid wax is heated until it is a fluid. The fluid is then filtered prior to developing the image. It is important to ensure that particles, such as contaminants or larger non-fluidized pieces of the wax do not clog the system. Therefore, a filter with high temperature stability may be required. Temperatures of 100 to 150° C. are common. In addition, in thermal ink jet printers, as well as the other ink jet printer technologies, the ink may be heated in the area of the spray port. Again, it is important to have a filter material that can withstand these elevated temperatures.

Accordingly, it is a primary purpose of the present invention to provide an improved filter for filtering contaminates from ink within an ink printer cartridge. Such improved filters preferably have a high percent open area for filtration and, therefore, provide a low resistance to flow. In addition, the required filtration efficiency of the printer is met.

A further purpose of the present invention is to provide an ink filter which is chemically inert, is resistant to elevated temperatures, and is easily bonded to the materials commonly used in ink printer cartridges.

These and other purposes of the present invention will be apparent based upon a review of the following specification.

SUMMARY OF THE INVENTION

The present invention provides an improved ink filter for removing contaminants and/or agglomerates from ink within an ink printer cartridge. The present invention utilizes the unique properties of a microporous membrane as the filter medium. In a preferred embodiment of the present invention, the filter material comprises a microporous membrane of expanded polytetrafluoroethylene (PTFE), sintered granular PTFE, polyolefin, ultrahigh molecular weight, polyethylene, and the like. In addition, in another embodiment of the present invention, the microporous membrane of the present invention can be laminated to a variety of backing materials.

The ink filter of the present invention comprises a layer of microporous membrane either alone or, in a preferred embodiment, bonded or laminated to a backing material using any number of suitable techniques. The two layer composite structure will hereafter be referred to as the "filter laminate." The filter can be formed in any desired shape and adhered or attached to the ink printer cartridge. In some cases, it may be desirable to adhere the filter to an assembly which can then be press fit or adhered to the ink printer cartridge.

In some cases, it may be necessary to treat the microporous membrane or the filter laminate with one or more hydrophilic materials. Specifically, because some microporous membranes may not be sufficiently hydrophilic to permit wetting by the ink, it may be desirable to coat or chemically alter one or more surfaces of the membrane to allow water based inks to wet the surface and flow through the filter.

The ink filter of the present invention provides exceptional filtration efficiency with low resistance to flow. This is due to the high percent open area of the microporous membrane, which is made possible by the structure of the microporous membrane and more specifically, the small fibril diameter of the ePTFE membrane. This lower resistance to flow provides a higher flow rate of ink through the filter, which can make possible higher printing speeds than observed with conventional ink filters. The filter disc or assembly of the present invention can be smaller in size than conventionally used ink filters, while still providing the required flow rates.

The ink filter laminate of the present invention is chemically compatible with the types of inks typically used in this industry. Particularly, the microporous membrane and the optional backing material can be selected to optimize chemical compatibility depending on the types of inks to be used. For example, an expanded PTFE bonded to a polypropylene spun-bonded nonwoven backing will have exceptional chemical inertness, while expanded PTFE alone will provide optimal chemical inertness.

The ink filter of the present invention can be more economical in use than conventional ink filters. The filter may be easily bonded or attached to the ink printer cartridge through the use of adhesives, thermal bonding, ultrasonic welding, the used of a snap fit assembly, and the like.

Further, the filter laminate of the present invention can be made to have minimal shedding, which allows for trouble free installation and operation. The microporous membrane and the optional backing material of the present invention can be selected to minimize shedding. For example, use of a microporous membrane alone, such as expanded PTFE, or an expanded PTFE laminated to a thermal plastic netting will have minimal shedding of components.

BRIEF DESCRIPTION OF THE DRAWINGS

The operation of the present invention should become apparent from the following description when considered in conjunction with the accompanying drawings, in which.

DETAILED DESCRIPTION OF THE INVENTION

The present invention provides an improved ink filter for removing contaminants and/or agglomerates from ink within an ink printer cartridge. In a preferred embodiment of the present invention, the filter material comprises a microporous membrane of expanded polytetrafluoroethylene (PTFE), sintered granular PTFE, polyolefin, ultrahigh molecular weight polyethylene, or the like. In addition, in another embodiment of the present invention, the microporous membrane of the present invention may be laminated to a variety of backing materials.

The filter medium of the present invention comprises a layer of microporous membrane either alone or laminated to a backing material by a variety of possible techniques. The two layer composite structure will hereafter be referred to as the "filter laminate." The filter can be formed in any desired shape and adhered or attached to the ink printer cartridge. In some cases, it may be desirable to adhere the filter to an assembly which can then be press fit or adhered to the ink printer cartridge.

Figure 1:
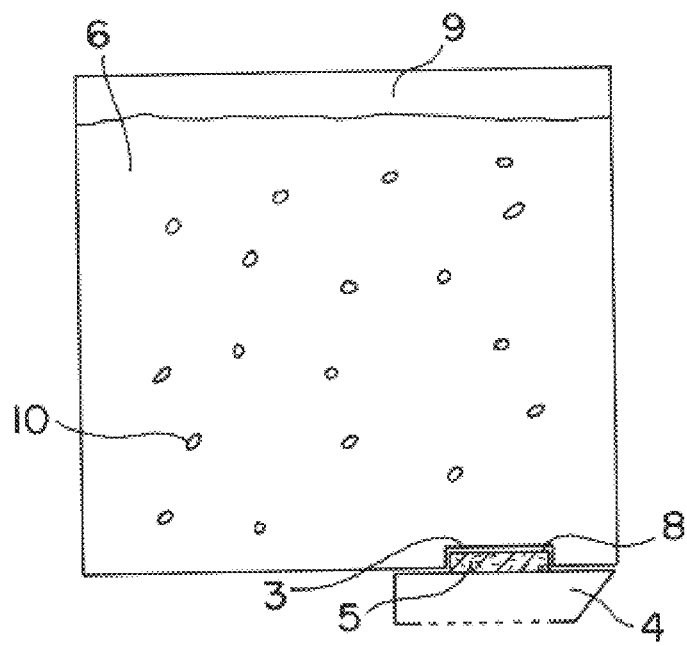
FIG. 1 is a cross-sectional view of the filter element of the present invention adhered to an ink printer cartridge.

As is shown in FIG. 1, the filter element 8, comprising a microporous membrane 5, and a backing material 3, of the present invention is attached to the ink printer cartridge in such a manner as to seal the top unfiltered volume of ink 6 from the bottom, filtered volume of ink 4. The positioning of the filter element of the present invention provides an ink flow path through the microporous medium. Large agglomerates and other contamination 10, in the ink are filtered out as they pass through the filter 8, prior to reaching the spray ports. The ink may be forced through the filter laminate by gravity, by pressure from the head space 9, as shown, or mechanically. In some cases the ink may be physically pressed, using a spring or other method, to create a force.

Figure 2:
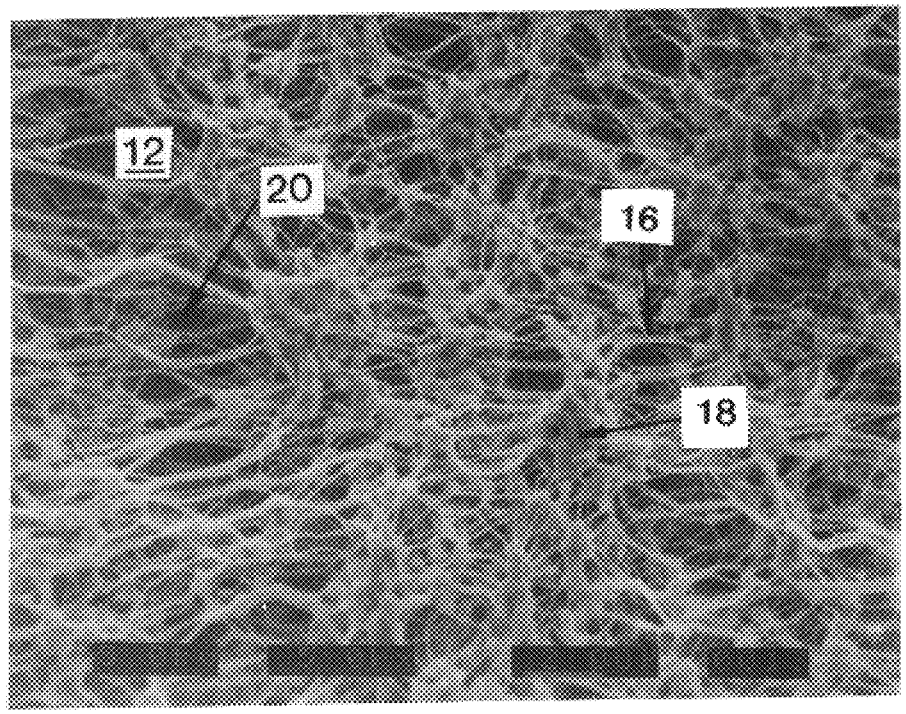
FIG. 2 is a surface scanning electron micrograph (SEM) at 5000X magnification of the expanded PTFE microporous membrane of the present invention.
Figure 3:
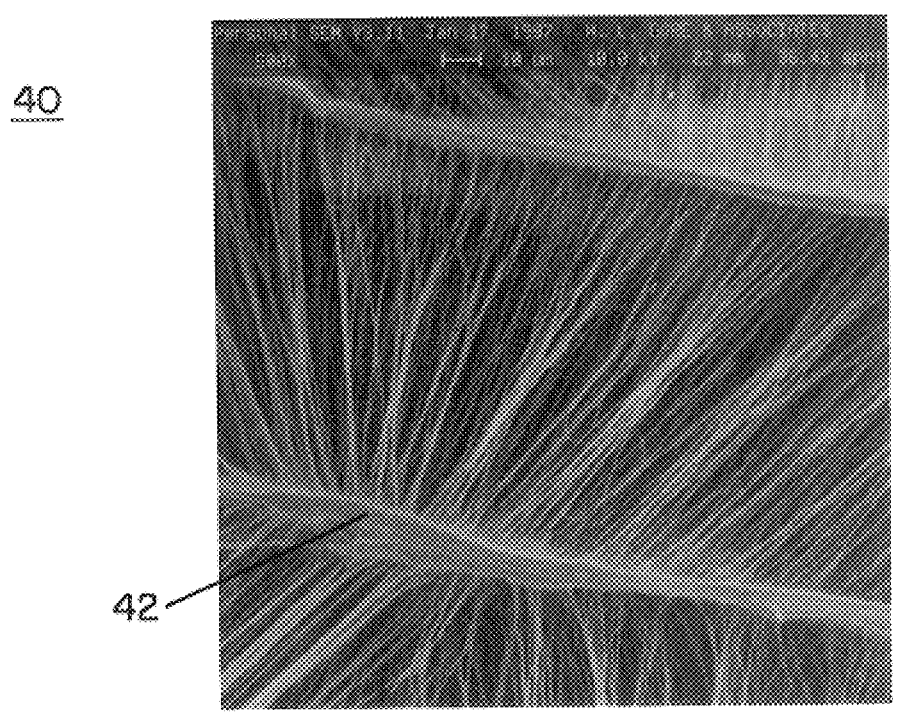
FIG. 3 is a surface SEM at 1000X magnification of the expanded PTFE microporous membrane of the present invention.

As shown in FIG. 2, in a preferred embodiment, the filter element of the present invention comprises an expanded PTFE membrane 30 consisting of nodes 18 and fibrils 16, with porosity 20 between the node and fibril structure. The nodes and fibrils create a network that can effectively capture contamination and agglomerates. The fibrils of the expanded PTFE of the present invention are extremely small in diameter, typically less than 1 micron. The structure, and specifically the length of the fibrils, can be controlled to tailor the filtration to a predetermined particle size. FIG. 3 is a surface SEM of an expanded PTFE microporous membrane 40 of the present invention with nodes 42 that have a high aspect ratio (e.g., greater than 25 to 1). The expanded PTFE microporous membrane of the present invention containing nodes with high aspect ratios can have a larger nominal pore size, which makes it ideal for nominal filtration of larger contamination.

Figure 4:
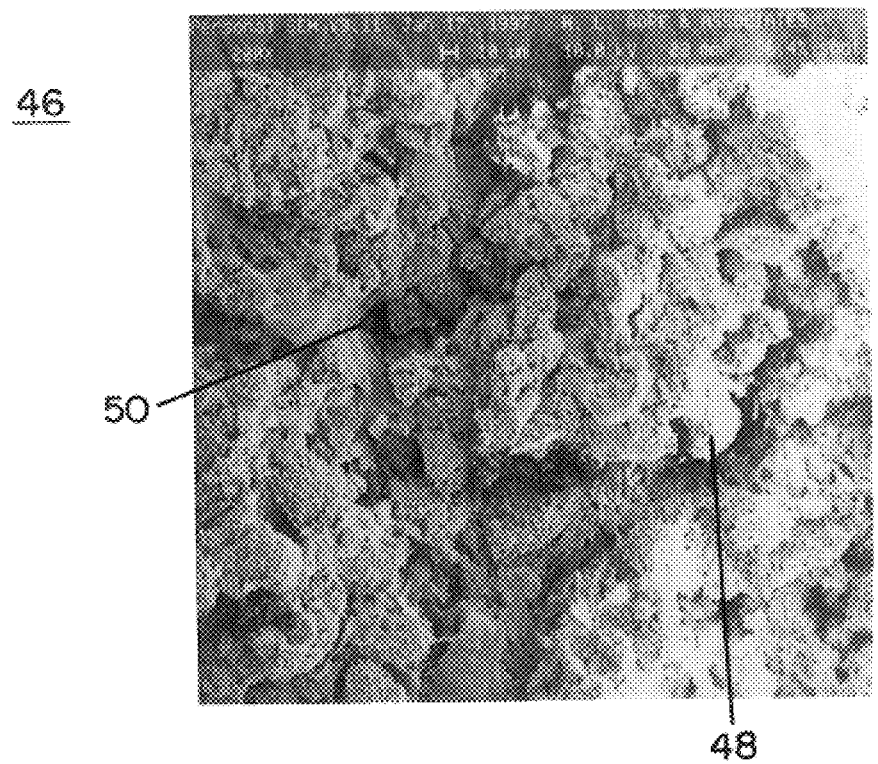
FIG. 4 is a surface SEM at 200X magnification of the sintered PTFE type of microporous membrane of the present invention.

As shown in FIG. 4, the filter element may comprise a sintered PTFE microporous membrane 46 consisting of granular particles of PTFE 48. The interstices between the particles 50 create a flow path for the ink to pass through. The sintered PTFE microporous membrane can be tailored to filter agglomerates/contaminants larger than a specified particle size by controlling the size and shape of the pores in the membrane. In an alternative embodiment, the membrane may comprise ultrahigh molecular weight polyethylene, or other suitable compositions.

Figure 5:
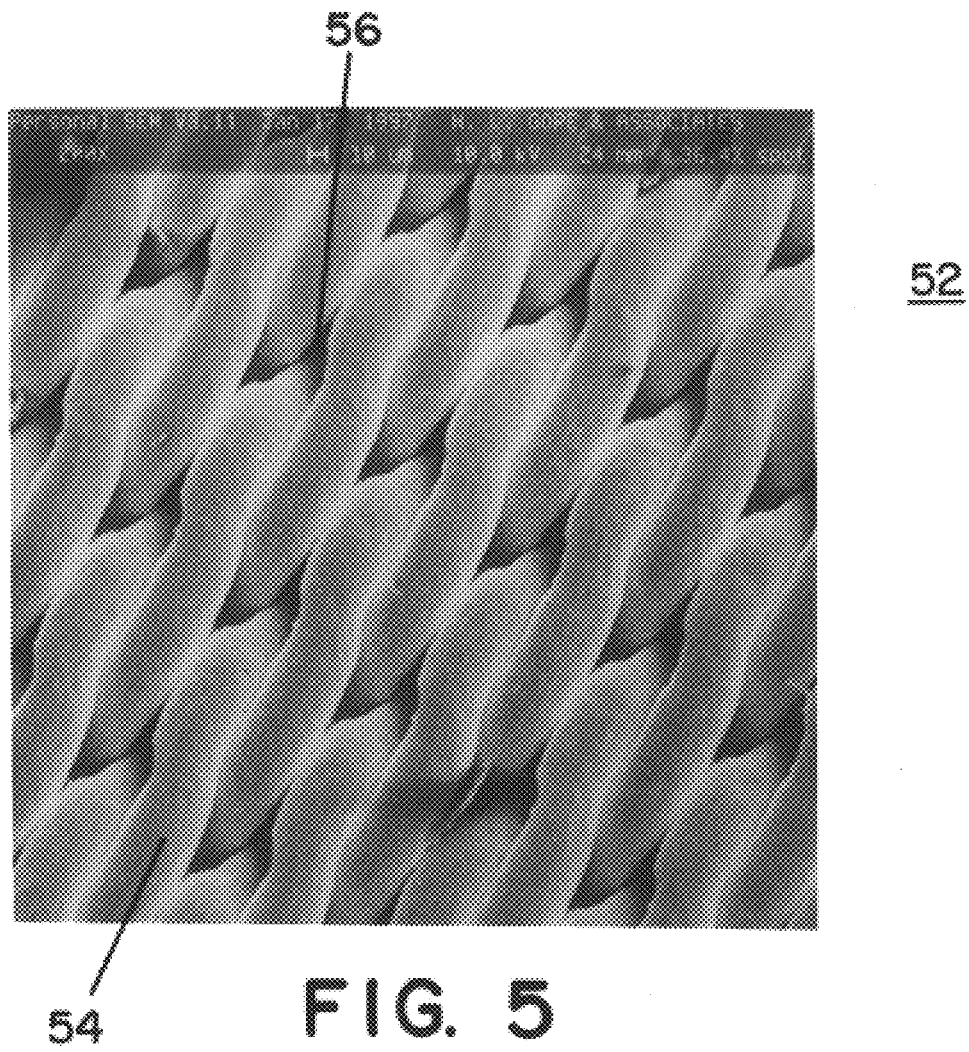
FIG. 5 is a surface SEM at 200X magnification of a woven stainless steel screen of the prior art.

FIG. 5 is a scanning electron micrograph of woven stainless steel screen 52, 250×1400 wires per inch of the prior art. The interstices 56 or openings between the wire 54 creates a flow path for the ink to flow through. It should be noted that the wire 54 has a large diameter relative to the size of the opening in the screen. Also, the percentage open area, or the percent area of interstices or openings to the solid areas, is extremely small. This small percentage open area creates a high resistance to flow. Furthermore, this small percentage open area can become clogged quickly.

Figure 6:
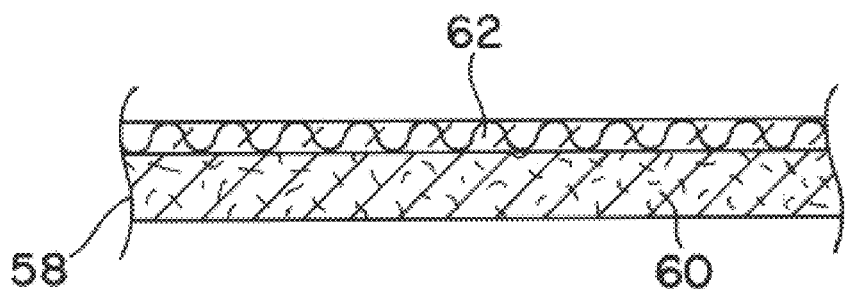
FIG. 6 is a cross sectional view of a filter laminate of the present invention.

FIG. 6 depicts a cross-section of the filter laminate 58 of the present invention which comprises a microporous membrane layer 60 bonded to a backing material 62. As mentioned, the filter element may comprise a microporous membrane either with or without a backing material. The term "microporous membrane," as used in the present application, is intended to refer to a continuous sheet of material that is at least 50% porous (i.e., it has a pore volume of $\geq$50%), with 50% or more of the pores being no more than about 30 micrometer in nominal diameter.

In cases where a backing material is desirable to provide support for the microporous membrane, the backing material may comprise any number of materials, such as nonwovens, netting, screens, fabrics or the like. The backing material of the present invention may comprise polypropylene, polyethylene, polyester, nylon, polyamide, polyimide, polyethylene naphthalate (PEN), polytetrafluoroethylene (PTFE), perfluoroalkoxy (PFA), fluorinated ethylene propylene (FEP), or the like, or combinations thereof, depending on what is needed in the particular application. Fabric substrate materials may be nonwoven, such as a spunbonded, melt blown or felted polyester, nylon, polyethylene, polypropylene, aramid, or it may be a woven material of polyester, nylon, polyethylene, polypropylene, aramid, PTFE, FEP, PFA, or the like. In some cases a woven stainless steel screen may be used as the backing material. The backing material is chosen to meet the specifications of the system, such as heat, mechanical, flow, and chemical compatibility requirements. A particularly preferred backing material for many applications is a nonwoven thermoplastic, and most preferably polypropylene or polyester.

As mentioned earlier herein, the microporous membrane component of the present ink filter element can be made from one of several microporous materials, including, but not limited to, expanded polytetrafluoroethylene (ePTFE), sintered granular PTFE, porous polyolefin (e.g., polypropylene), ultra high molecular weight polyethylene, and the like. Preferably, the microporous membrane comprises an expanded PTFE membrane including an expanded network of polymeric nodes and fibrils made in accordance with the teachings of U.S. Pat. Nos. 3,953,566, 3,962,153, 4,096,227, and 4,187,390, and PCT Publication No. WO 97/06206, all incorporated herein by reference. Materials are commercially available in a variety of forms from W. L. Gore & Associates, Inc., of Elkton, Md., under the trademark GORE-TEX®.

Preferably, the expanded PTFE membrane is made by blending PTFE fine particle dispersion, such as that available from E. I. du Pont de Nemours & Company, Wilmington, Del., with hydrocarbon mineral spirits. The lubricated PTFE is compacted and ram extruded through a die to form a tape. The tape can then be rolled down to a desired thickness using calendering rollers and subsequently dried by passing the tape over heated drying drums. The dried tape can then be expanded both longitudinally and transversely at elevated temperatures above the glass transition temperature of the PTFE, at a high rate of expansion, e.g., approximately 100 to 10,000% per second.

Suitable expanded PTFE membranes employed in the present invention should have the following properties: a thickness of about 0.0002" (0.0050 mm) to 0.125" (3.175 mm); a porosity of about 30 to 98%; and a bubble point (with isopropyl alcohol) of 0.2 to 60 psi. Preferred expanded PTFE membrane properties include: a thickness of about 0.0126 mm to 0.150 mm; a porosity of about 70 to 95%; and a bubble point of about 0.5 to 30 psi, with the most preferable being from 2.0 to 20 psi.

The expanded PTFE membrane is shown schematically in FIG. 2 and FIG. 3. This expanded PTFE material comprises polymeric nodes interconnected by polymeric fibrils. Microscopic pores are present between the nodes and fibrils which permit filtered ink to pass through the filter elements of the present invention. In some cases, it is important to have relatively large pores in order to allow an acceptable flow rate. In these high flow rate applications, an expanded PTFE membrane with large pores may be employed. Preferred fibril lengths for the materials of the present invention comprises lengths of 5 micron or greater.

The fibril length of expanded PTFE that has been expanded in a single direction is defined herein as the average of ten measurements between nodes connected by fibrils in the direction of expansion. The ten measurements are made on a representative micrograph of an expanded PTFE sample. The magnification of the micrograph should be sufficient to show at least five sequential fibrils within the length of the micrograph. Two parallel lines are drawn across the length of the micrograph so as to divide the image into three equal areas, with the lines being drawn in the direction of expansion and parallel to the direction of orientation of the fibrils. Measuring from left to right, five measurements of fibril length are made along the top line in the micrograph beginning with the first nodes to intersect the line near the left edge of the micrograph, and continuing with consecutive nodes intersecting the line. Five more measurements are made along the other line from right to left, beginning with the first node to intersect the line on the right side of the micrograph. The ten measurements obtained by this method are averaged to obtain the average fibril length of the material.

In one preferred embodiment, extremely large pore size membranes having high strength are preferred. One way to quantify this performance is by multiplying the Ball Burst strength by the Frazier value number. One membrane which exhibits this high Ball Burst vs. Frazier is a membrane which has high aspect ratio nodes giving a value of typically 25 or more. These high aspect ratio membranes are taught in PCT Publication No. WO 97/06206, published Feb. 20, 1997, in the names of Branca et al. This type of expanded PTFE membrane will be hereafter referred to as a "high node aspect ratio membrane".

Figure 8:
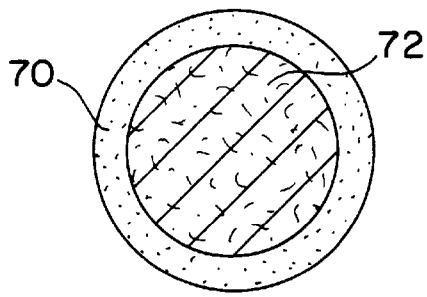
FIG. 8 is a top view of a microporous membrane of the present invention with an attached adhesive ring.
Figure 9:
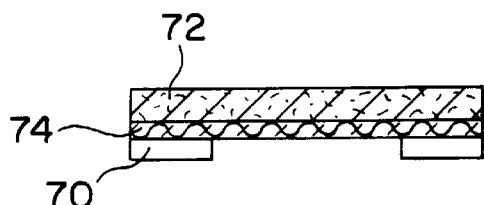
FIG. 9 is a cross-sectional view of the microporous membrane of the present invention, an adhesive ring, and the backing material of the present invention.
Figure 10:
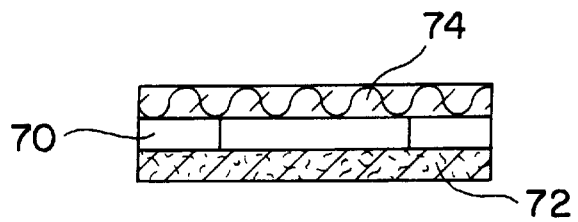
FIG. 10 is a cross-sectional view of a filter of the present invention incorporating an adhesive ring.

In a further embodiment of the present invention, the microporous membrane may optionally be attached to a backing material using a number of different methods. The two layers can be thermally fused together using a hot roll laminator, or the like. Alternatively, adhesive may be used in a discontinuous pattern to bond the two layers together, or the two layers may be ultrasonically adhered together. In some cases it may be desirable to use an adhesive ring 70, as depicted in FIG. 8, to attach the microporous membrane 72 to the ink printer cartridge, or to a filter assembly. Furthermore, the adhesive ring 70 may be adhered to a backing material 74, which is attached to the microporous membrane 72, as shown in FIG. 9. Another embodiment of the present invention, shown in FIG. 10, consists of the adhesive ring 70 between the microporous membrane 72 and the backing material 74. The adhesive ring attachment method allows for a higher flow rate through the center unbonded portion of the filter element. These and other similar methods can be used to attach the microporous membrane to the backing material.

Figure 12:
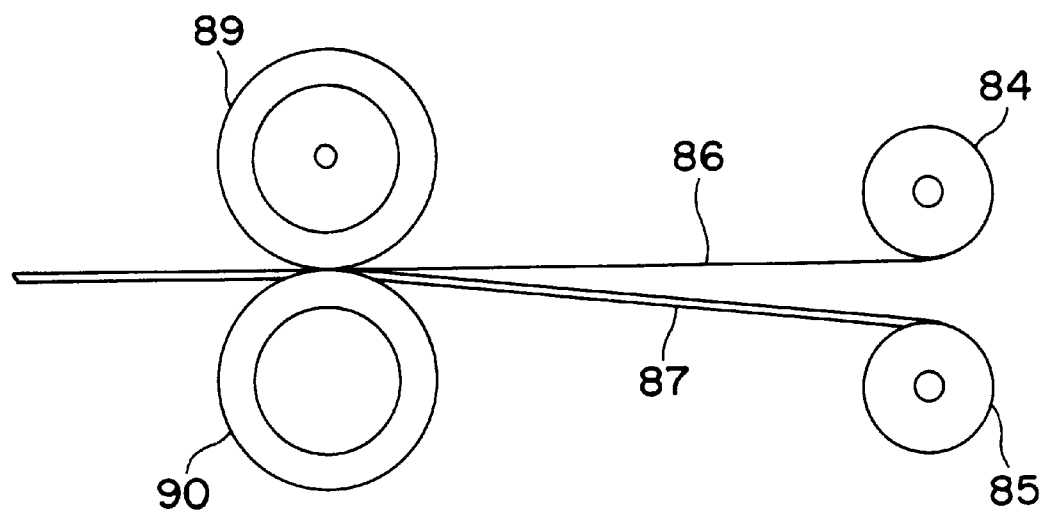
FIG. 12 is a cross-sectional view of a hot-roll laminator, and a microporous membrane being laminated to a backing.

The preferred method of bonding the microporous membrane to the backing is hot roll lamination, as depicted in FIG. 12. In this process, a delivery roll 84 of the microporous membrane 86 is placed over top of the delivery roll 85 of the backing material 87, and against the hot roll 88, as depicted in FIG. 12. The two materials are fed through the two compression rollers, namely, the hot roller 89, and the pressure roller 90. The hot roller 89 is typically a heated metal roller, and the pressure roller 90 is typically not heated and is typically coated with an elastomer to allow some conformance with the hot roller 89. The temperature, speed of lamination, and the pressure between the hot roll and the pressure roller are all set to a level sufficient to bond the layers together. These conditions may be tailored to suit the type of microporous membrane and backing material chosen.

In some cases it may be necessary or desirable to treat the microporous membrane of the present invention to make it hydrophobic. Typically the inks are water-based and contain some amount of surfactant and/or solvent to promote quick wetting into the paper. If the level of the surfactant is too low, the ink may not sufficiently wet out the microporous membrane to allow filtration to occur. It is therefore possible to treat the membrane in order to raise the surface energy of the material so that the ink will flow through.

There are a number of ways to enhance the hydrophilic nature of the microporous membrane of the present ink filter as well. For example, a surfactant solution may be applied to the membrane and then dried. This is a well know method, and any number of surfactants would be suitable for the treatment. The surfactant is typically added to water at a concentration of less than 10%. The surfactant treatment of the membrane has some drawbacks, in that it may not be fixed permanently to the microporous membrane, and may be removed from the microporous membrane as the ink is passed through the filter. If the surfactant is removed from the surface, the microporous membrane may no longer be hydrophilic. In a preferred embodiment, a permanent treatment, such as that described in U.S. Pat. No. 5,130,024, Fujimoto, Sakai, Japan Gore-Tex, Inc, may be desirable. This method involves treating the microporous membrane of the present invention with a hydrophilic fluorine-containing copolymer. This treatment is more durable, and thus more desirable, that the conventional surfactant treatment method. However, it should be understood that any hydrophilic treatment which suitably modified the surface of the ink filter element may be used in the present invention.

Figure 7:
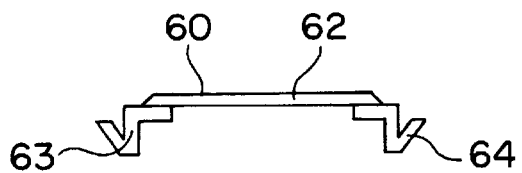
FIG. 7 is a cross sectional view of a filter assembly of the present invention.
Figure 11:
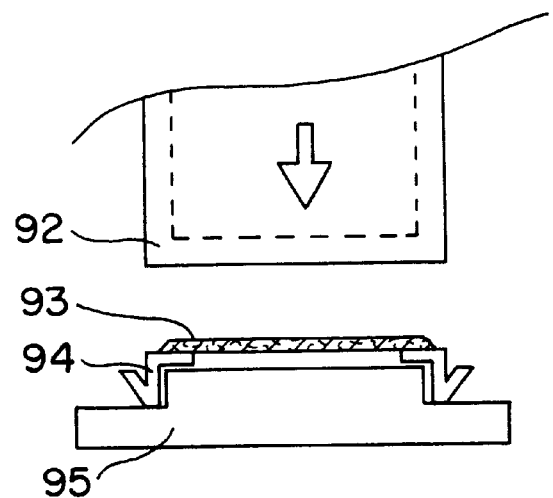
FIG. 11 is a side view of a filter laminate of the present invention being heat staked to a filter assembly.

The filter element of the present invention can be easily attached or adhered to the ink printer cartridge using any number of conventional methods. For example, the filter element may be heat staked as shown in FIG. 11. In this process, the thermal weld head 92 is heated to a temperature that will sufficiently cause the filter laminate 93 to bond to the thermoplastic material of the filter carrier 94 or ink printer cartridge. A base plate 95 is needed to hold the filter carrier and provide pressure. The filter laminate 93 can be permanently and completely sealed to the filter carrier 94 or ink printer cartridge using this method. There are a number of other methods of attaching the filter element to the filter carrier or ink printer cartridge. The filter element can be ultrasonically bonded to the cartridge body, or the filter element can be adhered with an adhesive ring or a conformable adhesive. Furthermore, the filter element of the present invention can be held in place with a gasket or a seal. Finally, in some cases the filter element may be adhered or attached to an assembly as shown in FIG. 7, which is then attached or adhered to the ink printer cartridge. In some cases the filter carrier 63 of FIG. 7, will have a snap fit ring 64, so that the assembly can be easily press fit into the printer cartridge.

The ink filter of the present invention provides a number of advantages over conventional ink filters. An important advantage is that the microporous membrane of the present invention, preferably the expanded PTFE membrane, can provide a high filtration efficiency at a very low resistance to ink flow. This feature is due to the fact that the microporous membrane of the present invention consists of extremely small fibril elements which allow much more open area for the flow of the ink, as can be seen from examination of the Figures.

Further, the materials of the filter element of the present invention can be chosen to provide acceptable chemical inertness for contact with the ink. The preferred microporous membrane of the present invention is expanded PTFE, which is extremely chemically inert to acids, bases and solvents.

In addition, the material of the ink filter of the present invention can be chosen to provide acceptable temperature stability for a specific application. In some applications, the ink is heated to a temperature to cause it to melt and flow, which is often the case with wax and other phase change printing technologies. In these types of applications, the filter element of the present invention may be required to withstand a continuous operation temperature of 150° C. or higher. Again, expanded PTFE microporous membrane is suitable for a continuous operating temperature of 250° C. Furthermore, for these high temperature applications, a number of suitable backing materials can be used, such as nylons and in some cases polyester. Moreover, if the application requires, a woven PTFE or stainless steel backing material could also be used.

The ink filter of the present invention is very easily bonded and sealed to the ink printer cartridge. Any number of standard methods can be used to provide an effective seal. A preferred method is heat stacking or ultrasonically welding. The expanded PTFE microporous membrane of the present invention is an ideal barrier for the direct application of a thermal heat stake head, or an ultrasonic horn. The expanded PTFE microporous membranes of the present invention can withstand extremely high temperatures, which allows the backing material and the cartridge material to melt and adhere to each other. This sealing process is much easier than what is currently used with conventional steel screen materials, where the edges of the woven screen materials are typically rough and jagged after die cutting, as discussed earlier herein.

Furthermore, the ink filter element of the present invention is less susceptible to shedding than conventional ink filters. As mentioned earlier, the woven screen that is typically used can shed fragments of the wire during operation or after sealing, which can clog the spray ports and interfere with the proper operation of the printer. The materials of the ink filter of the present invention can be chosen to eliminate shedding problems.

Test Procedures:

Bubble Point

The Bubble Point of porous PTFE was measured using a method similar to that set forth in ASTM Standard F316-86, incorporated by reference, with the following modifications: isopropyl alcohol was used instead of denatured alcohol; and the area tested is about 10 mm diameter (78.5 mm$^2$). The Bubble Point is the pressure of air required to blow the first continuous bubbles detectable by their rise through a layer of isopropyl alcohol covering the PTFE media.

Burst Strength-Ball Burst Test

This test measures the relative strength of a sample of membrane by determining the maximum load at break.

A single layer of membrane was challenged with a 1 inch diameter ball while being clamped and restrained in a ring of 3 inch inside diameter.

The membrane was placed taut in the ring and pressure applied against it by the steel ball of the ball burst probe. Maximum load was recorded as "Ball Burst" in pounds.

Frazier Number Air Permeability

Air permeability was measured by clamping a test sample in a circular gasketed flanged fixture 5.5 inches in diameter (23.76 square inches in area). The upstream side of the sample fixture was connected to a flow meter in line with a source of dry compressed air. The downstream side of the sample fixture was open to the atmosphere.

Testing was accomplished by applying an air pressure of 0.5 inches of water to the upstream side of the sample and recording the flow rate of air passing through the in-line flow meter (a ball-float rotameter).

Results are reported in terms of Frazier Number which has units of cubic feet/minute/square foot of sample at 0.5 inches of water pressure.

Liquid Filtration Efficiency Test (with 14.9 μm particles):

A solution of 14.9 μm polystyrene latex spheres, or other size as specifically noted otherwise, available from Duke Scientific Corporation, Palo Alto, Calif., was prepared such that exactly enough beads were in solution to create a uniform monolayer upon the entire surface of the sample to be tested. Often a large batch is made to assure a uniform solution preparation. This solution is known as the challenge solution.

The turbidity of the challenge solution was measured in NTU's (nepholemetric turbidity units) using a Hach 2100 N turbidimeter available from Hach Co., Loveland, Colo. A surfactant solution containing 2% by volume Triton X-100, from Union Carbide Corporation, Danbury Conn., was prepared. The sample to be tested was placed in a YY3014236 142 mm stainless steel holder available from Millipore Corp, Bedford, Mass. and sprayed with reagent grade isopropanol.

To begin the test, 500 ml of pure water (18MΩ) was added to the chamber and flushed through the sample. This was then repeated with 500 ml of the surfactant solution. A sample (about 50 ml) from the second half of the surfactant flush was collected and was known as the background sample. Next, 250 ml of the challenge solution was then added to the chamber, flushed, and collected. This was the effluent sample.

The efficiency of the sample was calculated by comparing the upstream turbidity to the downstream turbidity. Efficiency of the sample is defined as:

E=[1-(effluent-background)/(challenge-background)] *100% where effluent, background, and challenge are the turbidities (in NTU's) of the effluent sample, the background sample, and the challenge solution, respectively. If the turbidity of the background sample is greater than the effluent sample then the efficiency is said to be 100%.

Without intending to limit the scope of the present invention, the following examples illustrate the performance properties of the present invention.

EXAMPLE 1

Seven samples of an expanded polytetrafluoroethylene (ePTFE) ink filter membrane were obtained from W. L. Gore and Associates, Inc, Elkton, Md., having the following properties: 180 Frazier (ft3 air/ft2/min @ 0.5" H2O dP); 1.8 ball burst; 3.7 g/m2; mean tensile strength, longitudinal 7046 psi, transverse 9295 psi; mean flow pore size using coulter porometer 13.7 micron. The product of the Frazier number and the Ball Burst number for this microporous membrane was calculated to be 324. The membrane had a high aspect ratio, greater than 25 to 1, as depicted in FIG. 3.

This material was tested using the Liquid Filtration Efficiency Test of 14.9 μm particles. In addition, the following comparative prior art materials were tested:

1) Precision woven stainless steel screen 250×1400 from Tetko, Inc, Briarcliff Manor, N.Y.

2) Precision woven stainless steel screen 200×1400 from Tetko, Inc, Briarcliff Manor, N.Y.

Results:

| Sample | Background (NTU) | Effluent (NTU) | Efficiency (%) |
|---|---|---|---|
| Expanded PTFE Microporous Membrane Challenge Solution = 61.1 NTU | | | |
| 1 | 0.160 | 3.04 | 95.27 |
| 2 | 0.138 | 0.835 | 98.86 |
| 3 | 0.128 | 0.447 | 99.48 |
| 4 | 0.273 | 0.185 | 100 |
| 5 | 0.225 | 0.372 | 99.76 |
| 6 | 0.184 | 0.245 | 99.90 |
| 7 | 0.215 | 0.420 | 99.66 |
| Average of 7 samples = | | | 98.99 |
| Tetko stainless steel screen 250 × 1400 Challenge Solution = 55.1 NTU | | | |
| 1 | 0.214 | 1.15 | 98.3 |
| Tetko stainless steel screen 200 × 1400 Challenge Solution = 55.1 NTU | | | |
| 1 | 0.474 | 2.02 | 97.2 |
| 2 | 0.463 | 1.78 | 97.6 |
| Average of 2 samples = | | | 97.4 |

EXAMPLE 2

The testing procedure of Example 1 was repeated on the same expanded PTFE membrane used in Example 1. Liquid Filtration Efficiency Test was carried out using 22.1 µm latex particles, and only 4 samples of material were tested.

Results:

| ePTFE Microporous membrane Challenge Solution = 44.4 NTU | | | |
|---|---|---|---|
| Sample | Background (NTU) | Effluent (NTU) | Efficiency (%) |
| 1 | 0.126 | 0.076 | 100 |
| 2 | 0.096 | 0.073 | 100 |
| 3 | 0.092 | 0.060 | 100 |
| 4 | 0.084 | 0.102 | 99.96 |
| Average of 4 samples = | | | 99.99 |

EXAMPLE 3

Flow rate of ePTFE microporous membrane versus stainless steel screens (Tetko, Inc.) was tested. Materials tested: ePTFE membrane as described in Example 1.

Filter Laminate, comprising ePTFE membrane as described in Example 1, and spunbonded polypropylene nonwoven backing, 0.65 oz/yd², available from Reemay Inc., Old Hickory, Tenn. This filter laminate was fused together using a hot roll laminator. The hot roll laminator consists of a heated top metal roller, pressed against a silicone coated pressure roller. The diameter of both rolls was approximately 8" (20 cm). The conditions for lamination were a temperature of approximately 180° C., a pressure of about 30 psi, and a speed of about 35 feet per minute (fpm).

The same 250×1400 stainless steel screen as described in Example 1 was tested for comparison.

Hydrophilic preparation: The ePTFE membrane was sprayed with reagent grade isopropanol just prior to testing. The ePTFE membrane, polypropylene non-woven filter laminate was sprayed with a surfactant solution and dried before testing. No commercially available hydrophilic stainless screens are available. One screen was sprayed with isopropyl alcohol prior to testing.

Test method: A 2.25 inch (6 cm) diameter sample of the material to be tested was cut and placed in a support holder and attached to a vacuum line. The vacuum line was attached to an acrylic column which has been graduated at 25 ml increments. Between the column and the house vacuum valve was a pressure/vacuum regulator and manometer that provide good control and measurement (+/−0.1 inches of mercury) of the amount of vacuum being drawn.

The vacuum was set to 2" of mercury. The time to pull one liter of deionized (DI) $H_2O$ through the samples was measured and the flow rates were calculated. The results are:

| | 23.2 Gallons/ft²/min |
|---|---|
| ePTFE membrane: | (GSFM) |
| Filter Laminate | 20.9 GSFM |
| Stainless steel screen 250 × 1400 | 2.5 GSFM |
| Stainless Steel Screen sprayed with IPA: | 14.3 GSFM |

The ePTFE, filter laminate and the isopropyl alcohol (IPA) sprayed stainless steel screen samples were each tested 3 times; the above results are the average of 3 samples. The unmodified stainless steel screen was measured once.

EXAMPLE 4

Twelve expanded PTFE membrane samples made in accordance with the teachings of PCT Publication No. WO 97/06206, labeled A–L on the Table below, two woven screen samples, labeled DTW-6 and DTW-12, and five filter laminate material samples, labeled 1–5, were tested for both Frazier and Efficiency. All of the membrane samples were high node aspect ratio membranes, having a product of Frazier and Ball Burst greater than 60.

The two screen samples were:

DTW-6: Precision woven stainless steel screen, double Dutch twill weave - 375×2300, from Haver & Boecker Drahtweberei U. Maschinenfabrik (Germany).

DTW-12: Precision woven stainless steel screen, double Dutch twill weave - 200×1400, from Haver & Boecker Drahtweberei U. Maschinenfabrik (Germany).

The filter laminates 14 comprised laminates of high node aspect ratio expanded PTFE membranes bonded to a polypropylene netting backing material designated Part No. 6065 made by Conwed, Inc., and available from Internet Inc. (Minneapolis, Minn.) laminated on a hot roll laminator at approximately 255–265° C., at a pressure of 30–40 psi, and speed of 85–95 feet per minute (fpm). Filter laminate 5 was formed from an expanded PTFE membrane with a Frazier number of 25 and an efficiency of 67% laminated to Typar 8051T polypropylene nonwoven backing material, available from Snow Filtration (West Chester, Ohio). The layers were laminated on a hot roll laminator at approximately 262° C., at a pressure of 35 psi, and a speed of 47 fpm.

All of the samples were tested using the Liquid Filtration Efficiency Test using 4.5 µm latex particles. The Table includes performance results.

TABLE

| Sample | Frazier | Efficiency (at 4.5) | Thickness (mils) |
| --- | --- | --- | --- |
| Membrane # | | | |
| A | 70 | 72.1 | 2.5–3.2 |
| B | 81 | 70.2 | 1.7–2.4 |
| C | 98 | 57.2 | 1.3–1.7 |
| D | 26 | 99.17 | 1–2 |
| E | 120 | 73.6 | 0.5–1.0 |
| F | 100 | 85.98 | 0.5–1.0 |
| G | 11.22 | 99.95 | 2.5 |
| H | 22 | 87.04 | 2.9 |
| I | 39 | 50.8 | 6.4 |
| J | 12.97 | 100 | 4.2 |
| K | 10.83 | 99.64 | 5.5 |
| L | 42 | 51.79 | 6.9 |
| Screen | | | |
| DTW-6 | 12 | 96.2 | 35–40 |
| DTW-12 | 25 | 20.2 | 60–65 |
| Filter Laminate | | | |
| 1 | 18.5 | 99.49 | 13.5–15.0 |
| 2 | 80 | 63.3 | 13.5–15.0 |
| 3 | 55 | 80.2 | 13.5–15.0 |
| 4 | 37.5 | 90.4 | 13.5–15.0 |
| 5 | 17 | 57 | 17–19 |

Figure 13:
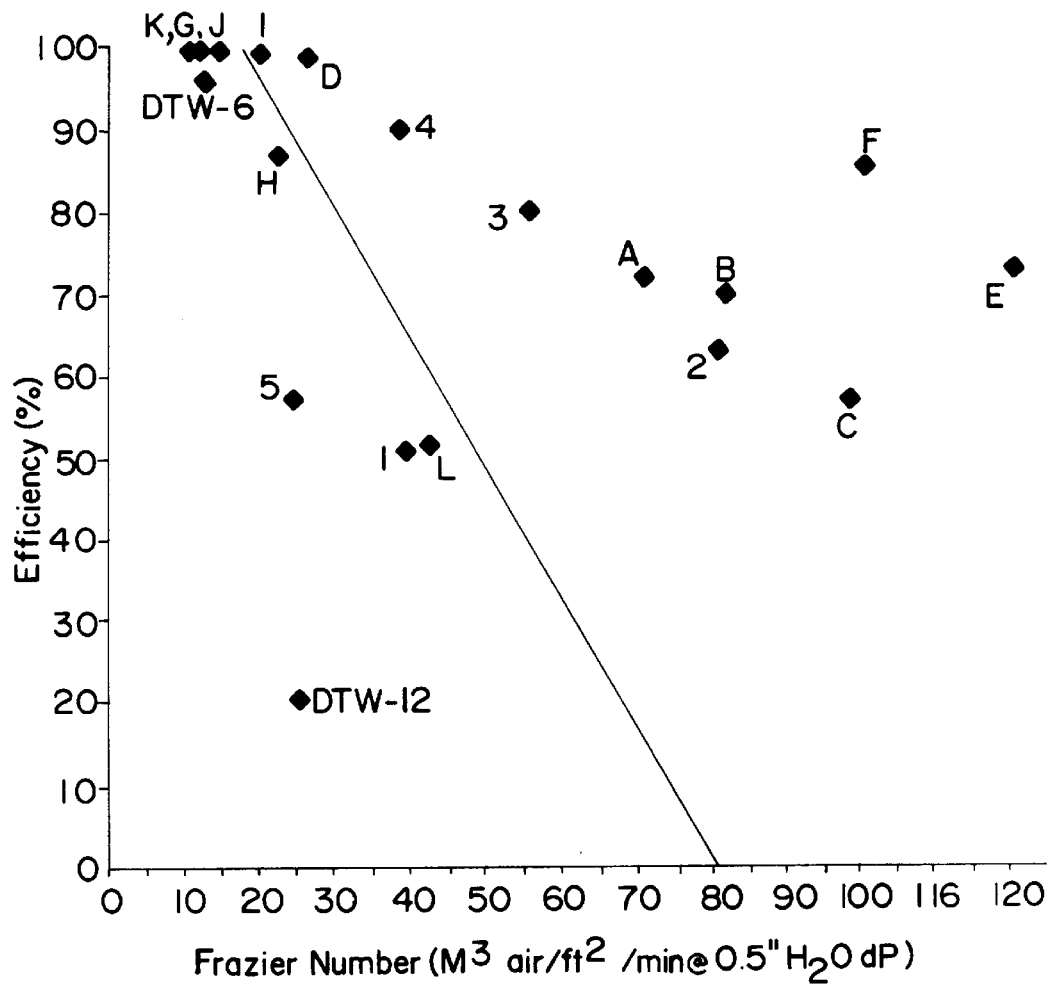
FIG. 13 is a graph of the Frazier vs. Efficiency (at 4.5 microns) performance of preferred ink filters of the present invention.

The high node aspect ratio ePTFE membrane samples and the filter laminates tested had much higher efficiency and Frazier values than the stainless steel screens. FIG. 13 is a graph of Frazier values versus Efficiency showing the performance of the samples listed in the Table. A line has been drawn on the graph that represents a high level of performance as determined by Frazier value and efficiency. The equation for this line is $0.65y+x=80$, where $y>50$ and $x>15$. The ePTFE membranes and laminates with performance above this line are considered to be materials which were heretofore unachievable based on the teachings of the prior art.

What is claimed is:

1. An article comprising a filter comprising a microporous membrane having a strength performance quantified by the product of ball burst of the membrane multiplied by the Frazier value of the membrane greater than 60, said filter having a permeability of at least 15 Frazier and an efficiency of at least 50% when subjected to a solution of 4.5 micron particle size.

2. The article of claim 1, further comprising a backing material laminated to at least a portion of said membrane.

3. The article of claim 2, wherein the backing material comprises a nonwoven thermoplastic.

4. The article of claim 2, wherein the microporous membrane is adhered to the backing material with an adhesive ring.

5. The article of claim 1, wherein the microporous membrane comprises expanded PTFE.

6. The article of claim 5, wherein the microporous membrane comprises a high node aspect ratio expanded PTFE.

7. The article of claim 1, wherein the microporous membrane comprises sintered granular PTFE particles.

8. The article of claim 1, wherein the microporous membrane is treated to render it hydrophilic.

9. The article of claim 1, wherein the filter is attached to an ink cartridge assembly.

10. The article of claim 9, wherein the filter is adhered to the ink cartridge assembly by an adhesive ring.

11. The article of claim 1, wherein the microporous membrane has an average distance between fibrils of greater than 0.5 micron.

12. The article of claim 1, wherein the product of ball burst multiplied by Frazier for the microporous membrane is greater than 324.

* * * * *